(12) United States Patent
Guo et al.

(10) Patent No.: US 11,197,483 B2
(45) Date of Patent: Dec. 14, 2021

(54) AUTOMATIC REMOVAL METHOD OF SHRIMP LINE

(71) Applicant: DALIAN UNIVERSITY OF TECHNOLOGY, Liaoning (CN)

(72) Inventors: Jiang Guo, Liaoning (CN); Yongbo Xu, Liaoning (CN); Bin Wang, Liaoning (CN); Chuanping Song, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 16/962,764

(22) PCT Filed: Mar. 13, 2019

(86) PCT No.: PCT/CN2019/077969
§ 371 (c)(1),
(2) Date: Jul. 16, 2020

(87) PCT Pub. No.: WO2020/107746
PCT Pub. Date: Jun. 4, 2020

(65) Prior Publication Data
US 2020/0352182 A1    Nov. 12, 2020

(30) Foreign Application Priority Data

Nov. 28, 2018 (CN) .......................... 201811429583.4

(51) Int. Cl.
*A22C 29/00* (2006.01)
*A22C 29/02* (2006.01)

(52) U.S. Cl.
CPC .................................. *A22C 29/022* (2013.01)

(58) Field of Classification Search
CPC .............................. A22C 29/00; A22C 29/022
(Continued)

(56) References Cited

U.S. PATENT DOCUMENTS

| 3,932,914 A | * | 1/1976 | Lapeyre | A22C 29/02 452/2 |
| 4,507,825 A | * | 4/1985 | Betts | A22C 29/02 452/2 |

(Continued)

FOREIGN PATENT DOCUMENTS

| CN | 201957680 U | 9/2011 |
| CN | 107223691 A | 10/2017 |

(Continued)

*Primary Examiner* — Richard T Price, Jr.
(74) *Attorney, Agent, or Firm* — Muncy, Geissler, Olds & Lowe, P.C.

(57) ABSTRACT

An automatic removal method of a shrimp line completes the automatic removal of the shrimp line based on a recognition system, a control system, a feed system, a detection device, a loading device and an auxiliary device. Firstly, by adopting a method of photographic contrast, in a moving process of a shrimp to be treated on a device, a photographing mechanism can take candid photographs according to a preset feature picture, and then controls the track of a tool to remove a shrimp line to complete the purpose of automatically removing the shrimp line. The method has small manual operation, high automation, safe operation, high integration degree of the device, portability, and good removal efficiency of the shrimp line, and is suitable for family meals and table food in restaurants.

2 Claims, 3 Drawing Sheets

(58) Field of Classification Search
USPC .......................................................... 452/1–3
See application file for complete search history.

(56) References Cited

U.S. PATENT DOCUMENTS

| | | | | |
|---|---|---|---|---|
| 5,035,669 | A | * | 7/1991 | Betts .................... A22C 29/026 452/5 |
| 5,035,670 | A | * | 7/1991 | Pershinske ........... A22C 29/026 452/5 |
| 5,522,764 | A | * | 6/1996 | Keith .................... A22C 29/026 452/177 |
| 2007/0281596 | A1 | * | 12/2007 | Sawyer ................ A22C 29/026 452/3 |
| 2015/0147946 | A1 | * | 5/2015 | Liang .................... A22C 29/026 452/3 |
| 2017/0036069 | A1 | * | 2/2017 | Sullivan ............... A63B 37/006 |

FOREIGN PATENT DOCUMENTS

| | | | |
|---|---|---|---|
| CN | 107242277 | A | 10/2017 |
| CN | 107333863 | A | 11/2017 |
| CN | 107960444 | A | 4/2018 |
| CN | 109527056 | A | 3/2019 |
| CN | 109588466 | A | 4/2019 |

* cited by examiner

AUTOMATIC REMOVAL METHOD OF SHRIMP LINE

TECHNICAL FIELD

The present invention belongs to the field of mechanical design, and relates to an automatic removal method of a shrimp line.

BACKGROUND

With the continuous improvement of human living quality, human living standards are also continuously improved, and shrimps as food materials gradually enter the daily life of people. However, removal and cleaning of the shrimps become an important problem, and especially removal of shrimp lines becomes a major challenge.

The so-called shrimp lines are the digestive tracts of the shrimps, and belong to the intestines of the shrimps. The shrimps live on carrion, which means that the shrimps eat rotten food including the carcasses of various fishes and other aquatic organisms. Eating of shrimps having shrimp lines that are not removed may bring certain influences on people, as follows:

(1) Eating of the shrimps having shrimp lines that are not removed may result in discomfort of people to a certain extent. Because the shrimps live on the carrion, residues in the intestines of the shrimps are dirty and extremely insanitary. The waste in the shrimp lines has high lead content. After people with poor resistance (children, old people, etc.) eat a large amount of shrimps having shrimp lines that are not removed, they may suffer from abdominal pain, diarrhea and other symptoms.

(2) Eating of the shrimps having shrimp lines that are not removed may influence the taste of people. When the shrimps are made spicy and quickly fried, because the tastes of the auxiliary materials are heavy, the influence is small. However, when the shrimps are steamed, people want to enjoy the "fresh" taste of the shrimps. At this moment, the shrimp lines influence the sweet tastes of the shrimps.

(3) Eating of the shrimps having shrimp lines that are not removed may bring a bad visual feeling to people. Because the shrimp lines contain the carcasses of the fishes and other aquatic organisms, the shrimp lines are mainly dark gray and black, which brings people a visual impact to a certain extent and further affects the eating pleasure of people.

To sum up, when the shrimps are eaten by people, to ensure the health of people and enhance the comfort during eating, removal of the shrimp lines becomes a trend. However, how to safely, efficiently and rapidly remove the shrimp lines becomes a current major challenge.

At present, in life, people often use the following two methods to remove the shrimp lines: the first method is to manually pick out the shrimp lines by a toothpick or other manual tools (Patent Publication Number is CN105594827A); and the second method is to cut a shrimp back from the back manually by a tool and then manually clean the shrimp (Patent Publication Number is CN107258872A). The two operation methods mainly depend on the operation ability of people for the shrimp lines.

Because the above two methods remove the shrimp lines manually and are low in safety and low in efficiency, no rapid and efficient method to remove the shrimp lines exists currently.

SUMMARY

In view of the defects in the prior art, the present invention proposes a new effective removal method of a shrimp line. The present invention completes the automatic removal of the shrimp line based on a recognition system, a control system, a feed system, a detection device, a loading device and an auxiliary device. Firstly, by adopting a method of photographic contrast, in a moving process of a shrimp to be treated on a device, a photographing mechanism can take candid photographs according to a preset feature picture, and then controls the track of a tool to remove a shrimp line to complete the purpose of automatically removing the shrimp line.

To achieve the above purpose, the present invention adopts the following technical solution:

An automatic removal device of a shrimp line comprises a recognition system, a control system, an automatic feed system, a detection device, a loading device 3 and an auxiliary device.

The recognition system comprises a high-definition camera 8 and a recognizer A; a feature picture a is pre-stored in the recognizer A; the high-definition camera 8 is used for recording and taking pictures, and is connected with a sliding block B6 and the recognizer A; and the high-definition camera 8 moves with the sliding block B6. In the recognition system: the recognizer A contrasts an image recorded by the high-definition camera 8 and the photographed picture with the feature picture a, and transmits results to the controller. The feature picture a is a pre-determined distinctive picture of the shrimp line and shrimp meat.

The control system comprises the controller, is connected with the recognition system and the automatic feed system, processes a signal transmitted by the recognition system, then converts the signal into an action command of the automatic feed system, and sends the action command to a three-dimensional feed mechanism.

The automatic feed system comprises a command receiver, the three-dimensional feed mechanism and a tool 4. The command receiver is connected with the three-dimensional feed mechanism for accepting the action command transmitted by the controller. The three-dimensional feed mechanism comprises guide rails 2, 5 and 7 in three directions and two sliding blocks A1 and B6; the sliding block A1 is connected with the X guide rail 2, and can smoothly move on the X guide rail 2; the sliding block A1 is provided with the loading device 3 to drive the loading device 3 to move back and forth in X direction; the Z guide rail 7 is connected with the Y guide rail 5, and the Z guide rail 7 can move back and forth on the Y guide rail 5 in Y direction; the sliding block B6 is connected with the Z guide rail 7, and can smoothly move on the Z guide rail 7; the sliding block B6 is provided with the tool 4 and the camera 8 which move with the sliding block B6; the tool 4 is connected with an air extractor and is hollow inside; and when the tool 4 moves in a specified track to cut a shrimp back, the shrimp line is sucked into the tool, to achieve the purpose of removing the shrimp line.

The detection system comprises a high-definition camera 8 and a recognizer B; a feature picture b is pre-stored in the recognizer B; and the high-definition camera 8 is used for recording and taking pictures. In the detection system: the recognizer B contrasts a picture taken by the high-definition camera 8 with the pre-stored feature picture b, and transmits results to the control system. The detection system is used for detecting whether the tool 4 achieves requirements after moving in the specified track under the action of the control system, and transmitting feedback information to the controller for next adjustment. The feature picture b is a distinctive picture on which the shrimp back is cut and the shrimp line is removed.

The loading device 3 comprises a loading substrate 13, and a positioning device 9, a clamping device 10 and an antiskid material 11 which are arranged on the loading substrate 13; and the loading device 3 is connected with the sliding block A1 and moves with the sliding block. No tight connection relationship exists between the positioning device 9 and the clamping device 10. The positioning device 9 has the main effect of ensuring accurate positioning of the shrimp, the shrimp back of the shrimp faces upwards; the clamping device 10 has the main effect of clamping the shrimp after the shrimp is positioned to ensure that the position of the shrimp may not be changed during later treatment; and the clamping device 10 adopts an electromagnetic clamping manner for clamping. The antiskid material 11 is connected to the clamping device 10, and has the main effect of increasing operability and realizing more safety in the process of positioning and clamping the shrimp. For example, a sponge material can be used to solve the problem that the shrimp is "smooth".

The auxiliary device comprises an air extractor; the air extractor is connected with the tool 4, and mainly provides certain suction, the shrimp line exposed in the moving process of the tool 4 in the specified track is sucked into the tool.

An automatic removal method of a shrimp line is realized based on the above automatic removal device and comprises the following steps:

step 1, placing the shrimps 12 to be treated into the loading device 3; moving back and forth, by the loading device 3, on the sliding block A1; and moving, by the loading device 3, towards an established direction in an established rate;

step 2, synchronously recording by the high-definition camera 8 in the moving process of the loading device 3; contrasting, by the recognizer A, the recorded image with the pre-stored feature picture a; in the contrast process, immediately stopping moving by the loading device 3 and transmitting the information to the controller if recognizing the shrimp meat and the shrimp line;

step 3, setting the track for the tool 4 by the controller according to the signal transmitted by the recognizer A in the step 2, wherein the set tool track is consistent with the shape of the shrimp line, and the set depth of the tool 4 is positioned at an upper edge 16 of the shrimp line to ensure that the shrimp line is not cut; controlling, by the controller, the tool 4 to move in the track, wherein at this moment, the shrimp back is gradually cut; in the process, the shrimp line exposed under the action of the air extractor is "sucked" into the tool; the shrimp line is completely "sucked" into the tool till the tool 4 completes the motion in the specified track; at this moment, the shrimp line of the shrimp is removed;

step 4, shooting, by the high-definition camera 8, the treated shrimp and obtaining a real-time picture; contrasting, by the recognizer B, the real-time picture with the pre-stored feature picture b and judging whether established requirements are achieved; if so, conducting a next step; otherwise, transmitting judgment information to the controller; then regulating the depth of the tool 4 until the requirements are achieved, wherein the feature picture b is a distinctive picture on which the shrimp back is cut and the shrimp line is removed;

step 5, after completely removing the shrimp line of one shrimp, continuing to move by the loading device 3 in the original direction and rate, treating a next shrimp line and repeating step 2 to step 5 until all the shrimps 12 to be treated on the loading device 3 are treated.

The present invention has the beneficial effects: the present invention can effectively solve many problems in the process of treating the shrimp line, has small manual operation, high automation, safe operation, high integration degree of the device, portability, and good removal efficiency of the shrimp line, and is suitable for family meals and table food in restaurants.

Figure 1:
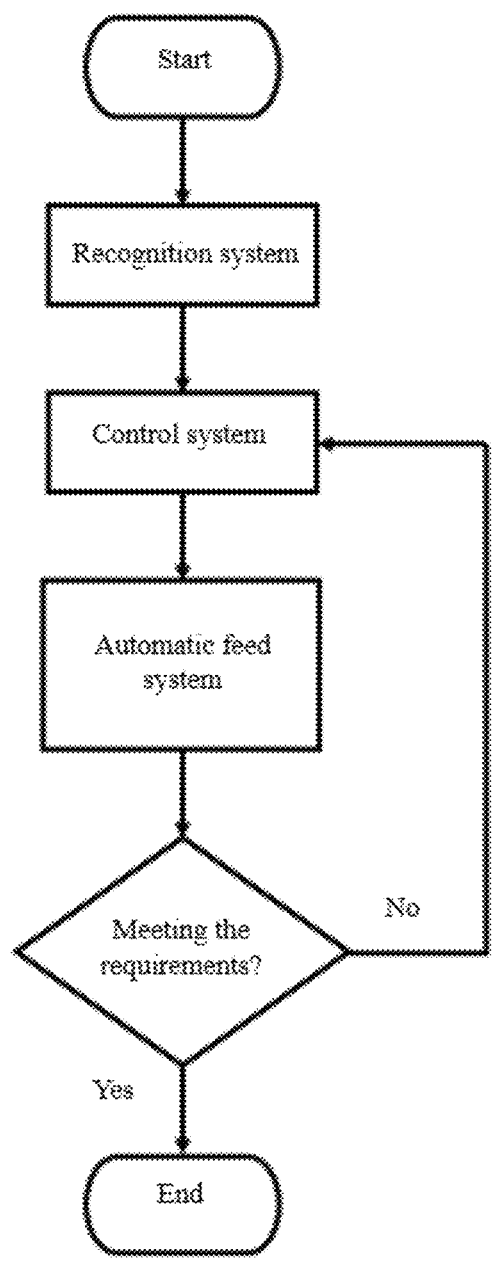
FIG. 1 is a flow chart of the present invention.
Figure 2:
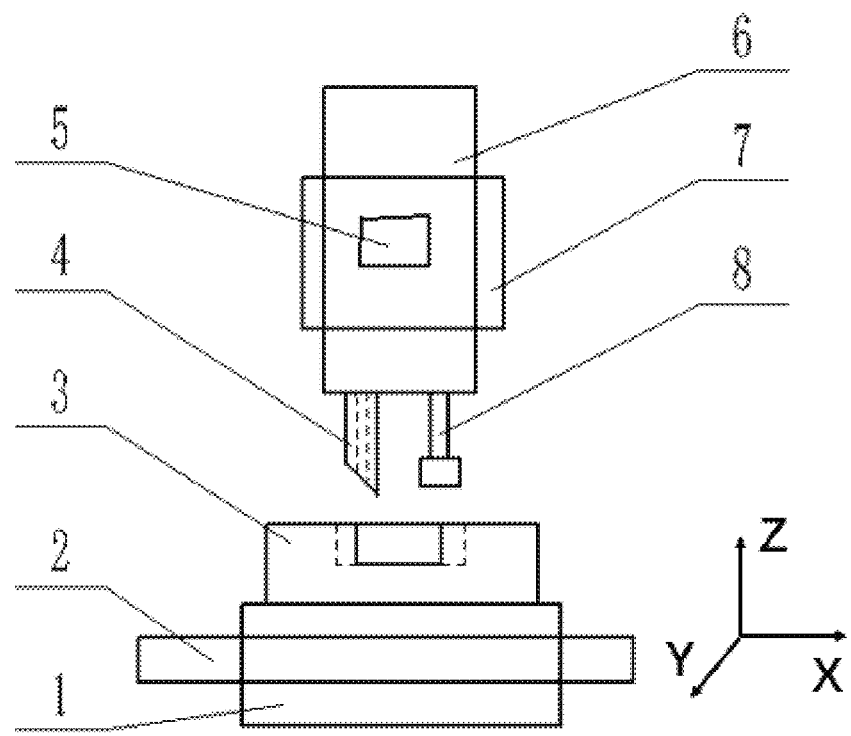
FIG. 2 is a schematic diagram of a whole device.
Figure 3:
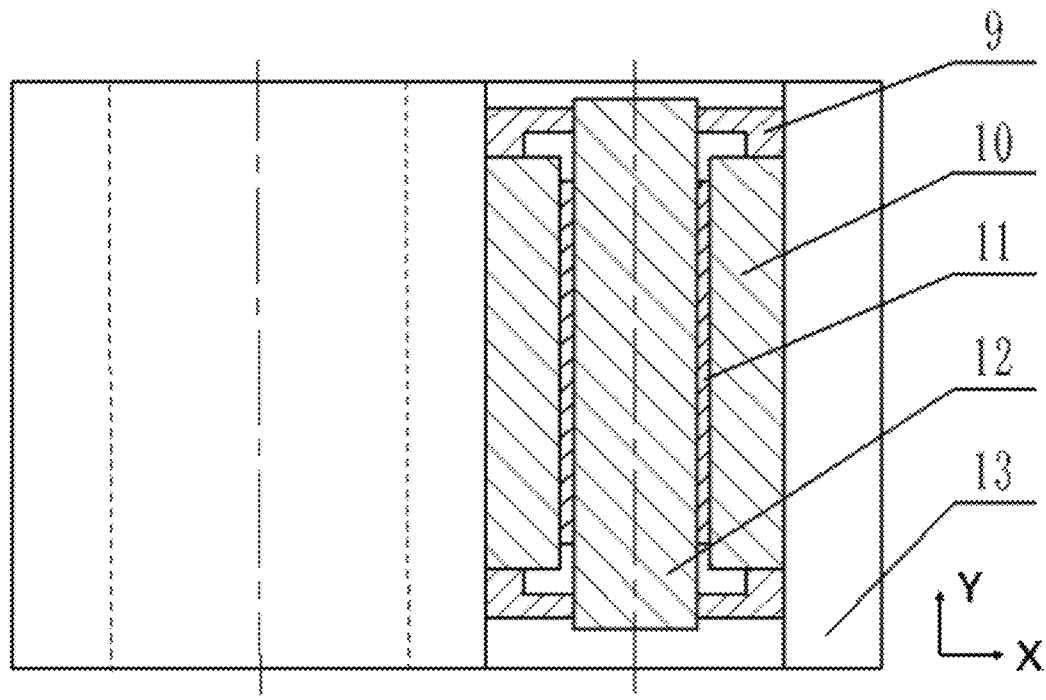
FIG. 3 is a schematic diagram of a loading device.
Figure 4:
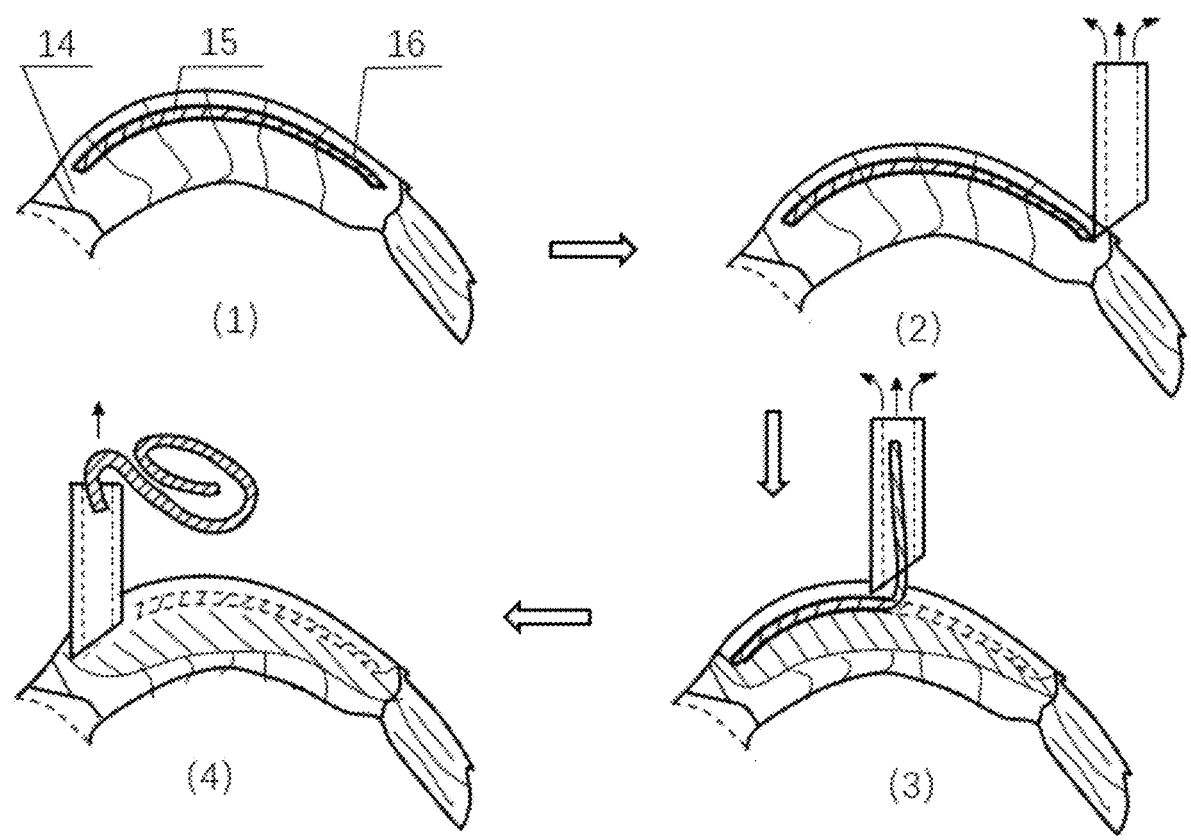
FIG. 4 is a brief step flow chart, wherein (1) shows a shrimp to be treated; (2) shows starting of removal of a shrimp line; (3) shows a process of removing the shrimp line; and (4) shows a treated shrimp and a removed shrimp line.

In the figures: 1 sliding block A; 2 X guide rail; 3 loading device; 4 tool; 5 Y guide rail; 6 sliding block B; 7 Z guide rail; 8 high-definition camera; 9 positioning device; 10 clamping device; 11 antiskid material; 12 shrimp to be treated; 13 loading substrate; 14 single shrimp; 15 shrimp line; and 16 upper edge of shrimp line.

DETAILED DESCRIPTION

Specific embodiments of the present invention are described below in detail in combination with the technical solution and accompanying drawings.

An automatic removal device of a shrimp line comprises a recognition system, a control system, an automatic feed system, a detection device, a loading device 3 and an auxiliary device.

The recognition system comprises a high-definition camera 8, a pre-stored feature picture a and a recognizer A; the high-definition camera 8 is connected with a sliding block B6 and moves with the sliding block B6; and the high-definition camera 8 has the main effect of recording an image and taking a picture in the recognition system. Feature picture a is a pre-determined distinctive picture of the shrimp line and shrimp meat. The recognizer A mainly contrasts an image recorded by the high-definition camera 8 and the photographed picture with the feature picture, and transmits results to the controller.

The control system comprises a controller, is connected with the recognition system and the automatic feed system, and has the main effects of processing a signal transmitted by the recognition system, then converting the signal into an action command of the automatic feed system, and sending the action command to a three-dimensional feed mechanism.

The automatic feed system comprises three parts: a command receiver, the three-dimensional feed mechanism and a tool 4. The command receiver has the main effect of accepting the action command transmitted by the controller. The three-dimensional feed mechanism comprises five parts: guide rails in three directions and two sliding blocks; the guide rails in three directions respectively correspond to an X guide rail 2, a Y guide rail 5 and a Z guide rail 7; the two sliding blocks respectively correspond to a sliding block A1 and a sliding block B6; the sliding block A1 is connected with the X guide rail 2, and the sliding block A1 can smoothly move on the X guide rail 2; the sliding block A1 can be connected with the loading device 3 to drive the loading device 3 to move back and forth in X direction; the Z guide rail 7 is connected with the Y guide rail 5, and the Z guide rail 7 can move back and forth on the Y guide rail 5 in Y direction; the sliding block B6 is connected with the Z guide rail 7, and the sliding block B6 can smoothly move on the Z guide rail 7; and the sliding block B6 can be connected with the tool 4 and the camera 8. The tool 4 is connected with the sliding block B6 and moves with the sliding block B6. The tool 4 has the main effects of moving in a specified track to cut a shrimp back, and sucking the exposed shrimp line into the tool in combination with an air extractor, to achieve the purpose of removing the shrimp line.

The detection system mainly comprises a high-definition camera 8, a pre-stored feature picture b and a recognizer B; and the high-definition camera 8 has the main effect of taking a picture in the detection system. The pre-stored feature picture b is a distinctive picture on which the shrimp back is cut and the shrimp line is removed. The recognizer B mainly contrasts a picture taken by the high-definition camera 8 with the pre-stored feature picture b, and transmits results to the control system. The detection system has the main effects of detecting whether the tool 4 achieves requirements after moving in the specified track under the action of the control system, and transmitting feedback information to the controller for next adjustment.

The loading device 3 comprises a positioning device 9, a clamping device 10, an antiskid material 11 and a loading substrate 13. The positioning device 9, the clamping device 10 and the antiskid material 11 are connected with the loading substrate 13. No tight connection relationship exists between the positioning device 9 and the clamping device 10. The antiskid material 11 is connected to the clamping device 10. The positioning device 9 has the main effect of ensuring accurate positioning of the shrimp, the shrimp back of the shrimp faces upwards; the clamping device 10 has the main effect of clamping the shrimp after the shrimp is positioned to ensure that the position of the shrimp may not be changed during later treatment; and the clamping device 10 adopts an electromagnetic clamping manner for clamping. The antiskid material 11 has the main effect of preventing the shrimp from sliding in the process of positioning and clamping the shrimp to make positioning and clamping more reliable. For example, a sponge can be used to solve the problem that the shrimp is "smooth". The loading device 3 is connected with the sliding block A1 and moves with the sliding block.

The auxiliary device comprises an air extractor; the air extractor is connected with the tool 4, and mainly provides certain suction, the shrimp line exposed in the moving process of the tool 4 in the specified track is sucked into the tool.

The removal method comprises the following steps:

step 1, placing the shrimps 12 to be treated into the loading device 3; moving back and forth, by the loading device 3, on the sliding block 1; and moving, by the loading device 3, towards an established direction in an established rate in the method;

step 2, synchronously recording by the high-definition camera 8 in the moving process of the loading device 3; contrasting, by the recognizer A, the recorded image with the pre-stored feature picture a; in the contrast process, immediately stopping moving by the loading device 3 and transmitting the information to the controller if recognizing the shrimp meat and the shrimp line;

step 3, setting the track for the tool 4 by the controller according to the signal transmitted by the recognizer A, wherein the set tool track is consistent with the shape of the shrimp line 15, and the set depth of the tool 4 is positioned at an upper edge 16 of the shrimp line of a single shrimp 14 to ensure that the shrimp line is not cut; controlling, by the controller, the tool 4 to move in the track, wherein at this moment, the shrimp back is gradually cut; in the process, the shrimp line exposed under the action of the air extractor is "sucked" into the tool; the shrimp line is completely "sucked" into the tool till the tool 4 completes the motion in the specified track; at this moment, the shrimp line of the shrimp is removed;

step 4, shooting, by the high-definition camera 8, the treated shrimp and obtaining a real-time picture; contrasting, by the recognizer B, the real-time picture with the pre-stored feature picture b and judging whether established requirements are achieved; if so, conducting a next step; otherwise, transmitting judgment information to the controller; then regulating the depth of the tool 4 until the requirements are achieved;

step 5, after completely removing the shrimp line of one shrimp, continuing to move by the loading device 3 in the original direction and rate, treating a next shrimp line and repeating step 2 to step 5 until all the shrimps 12 to be treated on the loading device 3 are treated.

The above embodiments only express the implementation of the present invention, and shall not be interpreted as a limitation to the scope of the patent for the present invention. It should be noted that, for those skilled in the art, several variations and improvements can also be made without departing from the concept of the present invention, all of which belong to the protection scope of the present invention.

The invention claimed is:

1. An automatic removal method of a shrimp line, wherein the method completes automatic removal of a shrimp line based on a recognition system, a control system, an automatic feed system, a detection device, a loading device and an auxiliary device, wherein the recognition system comprises a high-definition camera and a recognizer A of a pre-stored feature picture a; the control system comprises a controller; the automatic feed system comprises a command receiver, a three-dimensional feed mechanism and a tool; the detection device comprises a recognizer B of a pre-stored feature picture b; the auxiliary device comprises an air extractor which is connected with the tool;

the method comprises the following steps:

step 1, placing the shrimps to be treated into a loading device; and moving back and forth, by the loading device, on a sliding block A;

step 2, synchronously recording by the high-definition camera in the moving process of the loading device; contrasting, by the recognizer A, the recorded image with the pre-stored feature picture a; in the contrast process, immediately stopping moving by the loading device and transmitting an information to the controller if recognizing the shrimp meat and the shrimp line;

step 3, connecting the controller with the recognition system and the automatic feed system, processing a signal transmitted by the recognition system, then converting the signal into an action command of the automatic feed system, and sending the action command to the three-dimensional feed mechanism; the three-dimensional feed mechanism comprising guide rail X, guide rail Y and guide rail Z in three directions and sliding block A and sliding block B; connecting the sliding block A with the guide rail X to drive the loading device to move back and forth in X direction; connecting the guide rail Z with the guide rail Y, and moving back and forth, by the guide rail Z, on the guide rail Y in Y direction; connecting the sliding block B with the guide rail Z, and smoothly moving on the guide rail Z; installing the tool and the high-definition camera, which move with the sliding block B, on the sliding block B; setting a track for the tool according to a signal transmitted by the recognizer A in the step 2, wherein a set tool track is consistent with the shape of the shrimp line, and a set depth of the tool is positioned at an upper edge of the shrimp line to ensure that the shrimp line is not cut; controlling, by the controller, the tool to move in the track, wherein at this moment, the shrimp back is gradually cut; in the process, a shrimp line exposed under the action of an air extractor is "sucked" into the tool; the shrimp line is completely "sucked" into the tool till the tool completes a motion in a specified track; at this moment, the shrimp line of the shrimp is removed;

step 4, taking photos of a treated shrimp by the high-definition camera and obtaining a real-time picture; contrasting, by the recognizer B, the real-time picture with the pre-stored feature picture b and judging whether established requirements are achieved; if so, conducting a next step; otherwise, a transmitting judgment information to the controller; then regulating the depth of the tool until requirements are achieved, wherein the pre-stored feature b is a distinctive picture on which the shrimp back is cut and the shrimp line is removed;

step 5, after completely removing the shrimp line of one shrimp, continuing to move by the loading device in an original direction and rate, treating a next shrimp line and repeating step 2 to step 5 until all the shrimps to be treated on the loading device are treated.

2. The automatic removal method of a shrimp line according to claim 1, wherein the loading device comprises a loading substrate, and a positioning device and a clamping device which are arranged on the loading substrate; the positioning device is used for ensuring accurate positioning of the shrimp, the shrimp back of the shrimp faces upwards; after the shrimp is positioned, the shrimp is clamped by the clamping device; and the clamping device adopts an electromagnetic clamping manner.

* * * * *